May 3, 1960 W. L. L. VIVIE 2,935,271
FILM GUIDING AND TENSIONING DEVICE
Filed Oct. 1, 1954
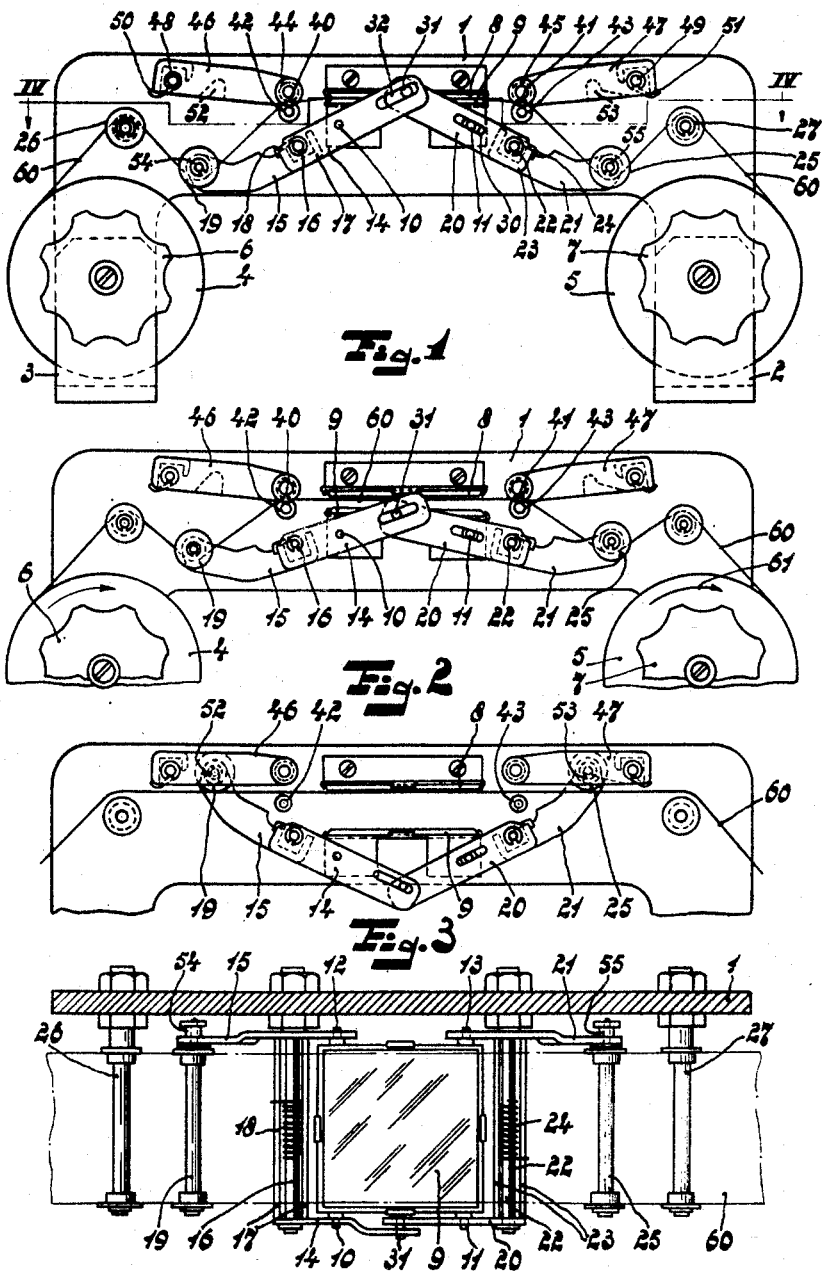
INVENTOR
WILHELMUS LAMBERTUS
LEONARDUS VIVIE
BY
AGENT

United States Patent Office 2,935,271
Patented May 3, 1960

2,935,271

FILM GUIDING AND TENSIONING DEVICE

Wilhelmus Lambertus Leonardus Vivie, Eindhoven, Netherlands, assignor, by mesne assignments, to North American Philips Company, Inc., New York, N.Y., a corporation of Delaware Application October 1, 1954, Serial No. 459,777

Claims priority, application Netherlands October 13, 1953

6 Claims. (Cl. 242—55.11)

The invention relates to a device in which a film can be held between elements engaging one another, and can be conveyed between said elements, the film being guided over at least one member coupled with at least one of the elements in a manner such that the tensile force exerted on one of the ends of the film owing to the tension in the film causes the member to move, so that the elements move automatically away from one another, the film being braked in order to obtain the required tension. Such devices may for example be used in magnifying apparatus or for the observation of the individual images of the film, for example an X-ray film, it being at the same time possible to expose these separate images and to project them onto a screen. The elements cause the film section to be observed to occupy the correct position in the direction at right angles to the direction of length of the film; they cause the film for example to be flat between them. The elements may be constituted by glass plates or by frames not covering the image.

In a known device of the aforesaid kind the film can be conveyed from a reel provided in the device between the elements to a reel also connected to the device by turning the winding-up reel manually. Between the reels and the elements the film is guided over the members. In order to obtain the required tension in the film the reels are braked. If the winding-up reel is stopped, the elements tend to engage one another, which must result in a displacement of the members. This displacement can be carried out only if the film is wound off the reel over a given stretch against the braking force. In the case of a completely symmetrical construction it is theoretically possible to wind off equal sections of the film from the two reels, so that between the elements the film is not displaced. In practice, however, this can be realized only with great difficulty, while, moreover, the symmetry is in general disturbed by the difference in diameter of the wound film on the two reels usually prevailing. Therefore the film will not be held in the position between the elements in which the winding-up reel is stopped in its rotation.

The invention has for its object to mitigate the aforesaid disadvantage.

According to the invention the film is braked to this end at at least one of the areas lying just on the same side of the member as the element. This has the advantage that after the winding-up reel has been stopped the member, in accordance with its position, can wind the film off the winding-up reel or the winding-off reel, the position of the film between the elements being maintained by the braking force. The elements are thus allowed to approach one another and to hold the film. It is not necessary to build the device so as to be symmetrical. If, however, on either side of the elements one member is provided to move the elements away from one another, the film is braked at least at one of the areas between the members and the elements. Owing to the braking force one member will wind the film only off the reel on the same side of the elements, the other member will do so with the other reel. In this case the two elements or only one of them may, of course, be secured to the device so as to be movable.

In a preferred embodiment of the device according to the invention the braking force is obtained by means of a stationary part of the device, against which the film is urged by a movable part provided on an arm subjected to spring force. Thus the film is guided during its conveyance in a fixed path between the elements by the brake, it being possible to open the brake to facilitate the introduction of the film into the device. In a device according to the invention, in which one element is stationary relative to the device and the film is braked on either side of the elements, the stationary parts of the brake may thus occupy a position relative to the stationary element such that during its conveyance the film is free from the element which is stationary relative to the device, owing to its own tension. The film is thus prevented from engaging the elements during conveyance, which might otherwise give rise to damage of the film images.

In order to facilitate the introduction of the film into the device, the member is secured to an arm, the other end of which is secured to the movable element in a manner such that in the extreme open position of the movable elements the end of the arm provided with the member engages an arm on which bears a movable part of the brake and which releases this movable part from the film. The introduction of the film may be further facilitated by arranging the member in the extreme open position of the elements in a manner such that the film can be stretched flat. The film can then be introduced in a flat stretched state into the device by a single movement of the hand. In order to hold the device in the position for introducing the film, the arm supporting the movable part of the brake is provided with a recess into which the member fits in a manner such, the elements occupying the extreme open position, that the whole device is held in this position.

The force exerted by the film on the members varies with the direction in which the film travels from the members to the winding-up reel and the winding-off reel. In order to maintain this direction, while the diameter of the film on the reels vary, a stationary guide member is provided between the member and the next following reel. This stationary guide member may be arranged in a manner such that in the extreme open position of the movable elements it allows the film to be stretched flat, so that the introduction and the removal of the film remains extremely simple.

The invention will now be described with reference to the accompanying drawing, which shows one embodiment.

The figures show a device according to the invention.

Fig. 1 is a lateral view of the device in the position in which the film is held between the elements.

Fig. 2 is a lateral view of the device in the position in which the film can be conveyed between the elements.

Fig. 3 is a lateral view of the device in the position in which the film can be introduced or removed and Fig. 4 is a fragmentary sectional view taken on the line IV—IV of Fig. 1.

The device comprises a supporting beam 1 having bent-up ends 2 and 3, to which reels 4 and 5 respectively are secured, provided with control-knobs 6 and 7 respectively. To the supporting beam 1 is secured rigidly an element in the form of a glass plate 8. In the drawing, below the glass plate 8 lies a second glass plate 9, which is suspended by means of shafts 10, 11, 12 and 13. The shafts 10 and 12 are journalled in arms 14 and 15 respectively, which are rotatable about a shaft 16 and coupled rigidly with one another by a U-shaped sleeve 17, so that a rotation of one of the arms 14 or 15 is followed by the other arm 15 or 14 respectively. A helical spring 18 surrounding the shaft 16 holds the arms 14 and 15 in their highest positions, so that the glass plate 9 engages the glass plate 8. The arm 15 extends beyond the shaft 16 and is provided at the other end with a member 19. The shafts 11 and 13 are journalled rotatably about a shaft 22 in a similar manner in arms 20 and 21 respectively. The arms 20 and 21 are coupled rigidly by a U-shaped sleeve 23. A helical spring 24 holds the arms 20 and 21 in their highest positions. The arm 21 is provided with a member 25. In order to permit the glass plate 9 to move by means of the arms 14, 15, 20 and 21, the shafts 11 and 13 are located in slot-shaped apertures of the arms 20 and 21 respectively, so that the shafts 11 and 13 are permited to move in the direction of length of the arms 20 and 21 respectively. The slot-shaped aperture of the arm 20 is designated by 30. The arms 14 and 20 are, moreover, coupled by a stud 31 provided on the arm 20, this stud being adapted to slide in a slot 32 of the arm 14. Thus the rotation of one of the members 19 or 25 about the shaft 16 or 22 respectively results automatically in a rotation of the other member 25 or 19 respectively about the shaft 22 or 16 respectively, so that the whole glass plate 9 is displaced. Between the members 19 and 25 and the reels 4 and 5 respectively provision is made of stationary guide pins 26 and 27 respectively on the supporting beam 1.

Between the members 19 and 25 and the glass plates 8 and 9 provision is made of the brakes 40 and 41 respecively, comprising parts 42 and 43 respectively in the shape of studs which are secured rigidly to the supporting beam 1 and parts 44 and 45 respectively in the form of studs which are secured rigidly to arms 46 and 47 respectively. The arms 46 and 47 are pivotable about shafts 48 and 49 respectively, secured to the supporting beam and are urged down by helical springs 50 and 51 respectively, viewed in the drawing, so that the parts 44 and 45 are held against the parts 42 and 43 respectively. The arms 46 and 47 are provided with recesses 52 and 53 respectively, in which the parts 54 and 55 of the members 19 and 25 respectively fit.

A film 60 lies as follows in the device. From the reel 4 the film 60 lies in succession over a stationary guide pin 26, then below the member 19, between parts 42 and 44 of the brake 40, between the glass plates 8 and 9, between the parts 43 and 45 of the brake 41, below the member 25 and over the stationary guide pin 27 about the reel 5.

The device operates as follows.

If the knob 7 is turned in the direction of the arrow 61, the brakes 40 and 41 will produce an increase in tension in the film 60, so that an upward force is exerted on the members 19 and 25, resulting in a downward movement of the glass plate 9 (see Fig. 2). Owing to the arrangement of the stationary parts 42 and 43 relative to the glass plate 8, the film 60 lies free from the glass plate 8 during its conveyance, so that in this time the film 60 cannot be damaged by the glass plates 8 or 9. When the image to be observed has arrived at the correct position between the glass plates 8 and 9, the knob 7 may be loosened without further measures. The part of the film between the glass plates 8 and 9 is held in place by the brakes 40 and 41, while the members 19 and 25 can readily return into their lower positions, since the member 19 can wind off the required film material from the reel 4 and the member 25 can wind this material from the reel 5.

In the extreme open position of the glass plate 9 (see Fig. 3) the film can be introduced in the flat stretched state into the device. In this extreme position the device is held since the parts 54 and 55 of the members 19 and 25 respectively are located in the recesses 52 and 53 respectively, so that the device is arrested in this position.

What is claimed is:

1. A film handling device comprising a support, a reel mounted on each end of said support, a first film position element secured to said support, a second film position element, means mounting said second element for movement toward and away from said first element, at least one film tension responsive member operatively coupled to said second element, braking means having a part fixed to said support and a movable part, resilient means urging said movable part against said fixed part for braking the film on one side of the film whereby the tension on the film created thereby produces a movement of said member which results in one element moving in a direction away from the other element.

2. A film handling device comprising a support, a reel mounted on each end of said support, a first film positioning element secured to said support, a second film positioning element, means mounting said second element for movement toward and away from said first element, at least one film tension responsive member operatively coupled to said second element, braking means including a part rigidly secured to said support, a movable arm mounted on said support, spring means urging the film against said part whereby the film is braked on one side thereof which creates a tension on the film thereby producing a movement of said film tension responsive member which results in said second element moving in a direction away from said first element to open position for permitting free passage of the film.

3. A film handling device comprising a support, a reel mounted on each end of said support, a first film positioning element secured to said support, a second film positioning element, means mounting said second element for movement toward and away from said first element, at least one film tension responsive member operatively coupled to said second element, braking means provided with a stationary part, said stationary part being located in relation to said first element whereby the film due to its tension during conveyance is free from contact with said first element, the film being braked on one side thereof which creates a tension on the film thereby producing a movement of said film tension responsive member which results in said second element moving in a direction away from the said first element to open position for permitting free passage of the film.

4. A film handling device comprising a support, a reel mounted on each end of said support, a first film positioning element secured to said support, a second film positioning element, means mounting said second element for movement toward and away from said first element, at least one film tension responsive member operatively coupled to said second element, braking means having a part fixed to the support and a movable part, resilient means urging said movable part against said fixed part for braking the film on one side of the film whereby the tension on the film created thereby produces a movement of said film tension responsive member which results in said second element moving in a direction away from the said first element to open position for permitting free passage of the film, an arm secured to one end of said member, the other end of said member being connected to said second element whereby in open position of said elements the end of the arm secured to one end of said member operatively engages a part of said braking means whereby said part is removed from engagement with the film.

5. A film handling device comprising a support, a reel mounted on each end of said support, a first film positioning element secured to said support, a second film positioning element, means mounting said second element for movement toward and away from said first element, at least one film tension responsive member operatively coupled to said second element, braking means having a part fixed to the support and a movable part, resilient means urging said movable part against said fixed part for braking the film on one side of the film whereby the tension on the film created thereby produces a movement of said film tension responsive member which results in said second element moving in a direction away from said first element to open position for permitting free passage of the film, and wherein in the extreme open position of said elements said member has a position whereby the film may be stretched flat.

6. A film handling device comprising a support, a reel mounted on each end of said support, a first film positioning element secured to said support, a second film positioning element, means mounting said second element for movement toward and away from said first element, at least one film tension responsive member operatively coupled to said second element, braking means having a part fixed to said support and a movable part, said movable part including an arm provided with a recess whereby in the extreme open position of said elements a part of said member is inserted in said recess, said braking means braking the film on one side thereof whereby the tension on the film created thereby produces a movement of said film tension responsive member which results in said second element moving in a direction away from said first element to open position for permitting free passage of the film.

References Cited in the file of this patent
UNITED STATES PATENTS

| | | |
|---|---|---|
| 1,944,022 | Bundick et al. | Jan. 16, 1934 |
| 1,944,035 | Proctor | Jan. 16, 1934 |
| 2,051,036 | Foster et al. | Aug. 18, 1936 |
| 2,051,787 | Foster | Aug. 18, 1936 |
| 2,115,737 | Menschner | May 3, 1938 |
| 2,468,198 | Heller | Apr. 26, 1949 |
| 2,534,083 | Van Den Broek | Dec. 12, 1950 |
| 2,547,186 | Walker | Apr. 3, 1951 |